United States Patent [19]

Hoang et al.

[11] Patent Number: 5,288,351
[45] Date of Patent: Feb. 22, 1994

[54] SILVER PASTE SINTERING METHOD FOR BONDING CERAMIC SURFACES

[75] Inventors: Truc G. N. Hoang, San Diego, Calif.; Douglas Morris; Daniel H. Balinski, both of Albuquerque, N. Mex.

[73] Assignee: Motorola, Inc., Schaumburg, Ill.

[21] Appl. No.: 801,212

[22] Filed: Dec. 2, 1991

[51] Int. Cl.5 .................... C04B 37/00; B32B 18/00
[52] U.S. Cl. ..................... 156/89; 156/325; 228/121; 419/8; 419/10
[58] Field of Search .............. 228/121, 903; 156/89, 156/325; 419/8, 10

[56] References Cited

U.S. PATENT DOCUMENTS

| | | | |
|---|---|---|---|
| 4,082,906 | 4/1978 | Amin et al. | 156/89 |
| 4,609,892 | 9/1986 | Higgins | 333/204 |
| 4,785,271 | 1/1988 | Higgins | 333/204 |
| 4,940,955 | 7/1990 | Higgins | 333/204 |
| 5,098,494 | 3/1992 | Reisman | 156/89 |

*Primary Examiner*—Jan H. Silbaugh
*Assistant Examiner*—Christopher A. Fiorilla
*Attorney, Agent, or Firm*—Douglas D. Fekete

[57] ABSTRACT

A method for bonding a first ceramic element and a second ceramic element utilizes a silver powder paste composed of silver particles dispersed in a volatile vehicle. A film of the paste is applied and dried onto a faying surface of each element. The elements are assembled with the films in contact and heated to sinter the silver particles into an integral silver layer that is bonded to the faying surfaces, thereby bonding the elements together. The method is particularly well suited to manufacturing a stripline filter, wherein the sintered layer not only bonds the ceramic elements, but also forms a metallic feature, such as a resonator, of the filter.

16 Claims, 1 Drawing Sheet

SILVER PASTE SINTERING METHOD FOR BONDING CERAMIC SURFACES

BACKGROUND OF THE INVENTION

This invention relates to a method for forming a structure comprising ceramic elements bonded by a sintered silver layer. More particularly, this invention relates to a method for bonding ceramic elements that includes applying a thick film of a paste comprising a silver powder to the faying surfaces, and sintering the silver powder to produce an integral layer bonding the surfaces.

In a radio transmitting or receiving device, a stripline filter is employed to select signals within a relatively narrow frequency band, referred to as a passband, and to shunt signals having frequencies outside the passband. The stripline filter comprises a metallic resonator sandwiched between ceramic elements and capacitively coupled to an external ground plate for shunting the unwanted signals.

One method for manufacturing a stripline filter comprises soldering silver films applied to surfaces of preformed ceramic elements. The silver films are applied in a superposable pattern corresponding to the desired configuration of the resonator. The silver films are formed by applying a paste composed of silver powder dispersed in a volatile solvent containing an organic binder. The paste is dried to remove the solvent and fired to vaporize the binder and to sinter the silver particles into an integral layer.

To bond the elements together, a film of a solder paste is applied to one of the sintered silver films. The solder paste comprises particles composed of a low melting solder alloy and dispersed in a solvent vehicle, similar to the silver paste. A common solder for this purpose is composed of a tin-base alloy containing about 5 weight percent silver. The elements are arranged with the second silver film resting against the solder particulate film. The assembly is then heated at a temperature, typically less than about 300° C., sufficient to melt the solder alloy and fuse the solder to the adjacent silver films. Upon cooling, the solder resolidifies and bonds to the silver films, thereby joining the ceramic elements into an integral structure.

Upon soldering, the molten solder wets the silver films, which is essential to forming a strong solder bond. In contrast, molten solder does not wet ceramic surface, and does not bond directly to the ceramic element, thus necessitating the silver films. The resulting metal layer thus comprises silver films bonded to the ceramic and solder-bonded to an intermediate reflowed tin-base alloy film.

In bonding the ceramic elements utilizing an intermediate solder film, additional steps are required to apply to solder paste, thereby adding to the cost of the product. Oxides and other contaminants on the silver surface inhibit wetting by the solder alloy and thus interfere with the formation of a strong solder bond. Furthermore, silver is soluble in the molten solder alloy. Thus, there is a tendency for silver to leach from the film into the solder alloy. Accordingly, it is necessary to carefully control the reflow time and temperature to avoid complete dissolution of the silver film that would otherwise prevent bonding to the ceramic. Still further, subsequent processing steps are limited by the solder reflow temperature, since higher temperatures are accompanied by a melting of the solder alloy, which would allow the elements to shift or cause further leaching of the silver film.

SUMMARY OF THE INVENTION

This invention contemplates a method for bonding a first ceramic element to a second ceramic element utilizing a sintered metal powder layer. The method utilizes a paste composed predominantly of silver powder dispersed in a volatile solvent vehicle. A first film of the paste is applied to the faying surface of the first element and dried. A similar film of the paste is applied and dried onto the faying surface of the second element. The elements are assembled with the first film in contact with the second film. The assembly is heated at a temperature and for a time sufficient to sinter the silver particles into an integral silver layer. During sintering, the silver layer bonds to the adjacent ceramic. The sintered product thus comprises the first and second ceramic elements bonded by the silver layer.

Therefore, this invention provides a solid-state method for bonding ceramic elements into an integral assembly using a silver layer. The method is carried out at a temperature sufficient to diffusion bond the silver particles, but less than the melting point of the metal to avoid formation of a liquid phase. This is a marked contrast to soldering techniques that require formation of a liquid phase to achieve bonding. The method of this invention eliminates the steps required for applying a solder paste, and, more significantly, avoids problems associated with wetting or leaching the silver. The method produces an assembly that includes a predominantly silver layer suitable for processing at higher temperatures without compromising the integrity of the assembly. Thus, the method of this invention is particularly well suited for forming a stripline filter wherein the intermediate metal layer not only bonds the ceramic elements, but also serves as a functional element, such as a resonator, in the product.

BRIEF DESCRIPTION OF THE DRAWINGS

The present invention will be further illustrated with reference to the accompanying drawings wherein.

DETAILED DESCRIPTION OF THE INVENTION

Figure 1:
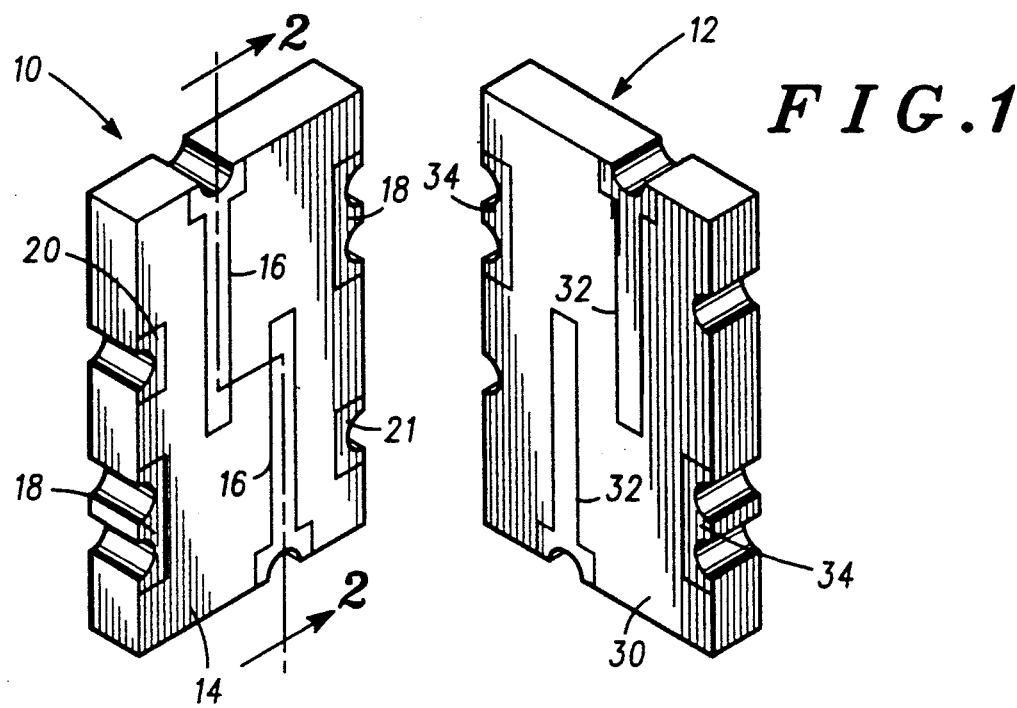
FIG. 1 is a perspective view showing separate elements in readiness for assembly to manufacture a stripline filter by the method of this invention.

In accordance with a preferred embodiment, a silver paste bonding method of this invention is employed to produce a stripline filter. Referring to FIG. 1, the filter is formed of a first ceramic element 10 and a second ceramic element 12. The ceramic composition is typically selected to obtain particular dielectric properties dependent upon the desired performance characteristics of the filter. A preferred dielectric ceramic is bismuth-modified barium neodynmium titanate compound, $BaNd_2Bi_{0.13}Ti_5O_{14}$.

Referring again to FIG. 1, element 10 comprises a generally planar faying surface 14. In accordance with the method of this invention, a silver powder paste is screen printed onto selected regions of faying surface 12 in a predetermined pattern. The specific configuration of the film is determined by the desired electrical features of the product filter. In this embodiment, films 16 are applied to form resonators in the product filter. Films 18 are applied to form ground plates, whereas films 20 and 21 are applied to form input and output pads. A preferred paste comprises silver powder dispersed in a terpinol vehicle. The powder consists substantially of silver metal, except for impurities, and preferably constitutes about 84 weight percent of the paste. In addition, the paste may include powdered glass or other oxide additives to enhance bonding of the silver to the ceramic substrate. The paste also includes an expendable binder composed of an organic compound dissolved in the vehicle for temporarily binding the silver powders prior to sintering. A suitable paste is commercially available from Heraeus Cermalloy, Inc., under the trade designations Silver Paste 8710. The paste is applied in a thickness on the order of about 65 microns and is dried in air at about 150° C. for 20 minutes to substantially remove the solvent. The dried film is formed predominantly of silver particles and has a thickness of about 30 microns.

The silver powder is similarly applied to a faying surface 30 of second element 12 and dried to form predominantly silver particle films. Paste is applied in a pattern superposable onto the films on first faying surface 14. In particular, faying surface 30 comprises films 32 for forming a resonator element and films 34 for forming ground elements. In this embodiment, films corresponding to input and output pads 20 and 22 are not duplicated on faying surface 30.

Figure 2:
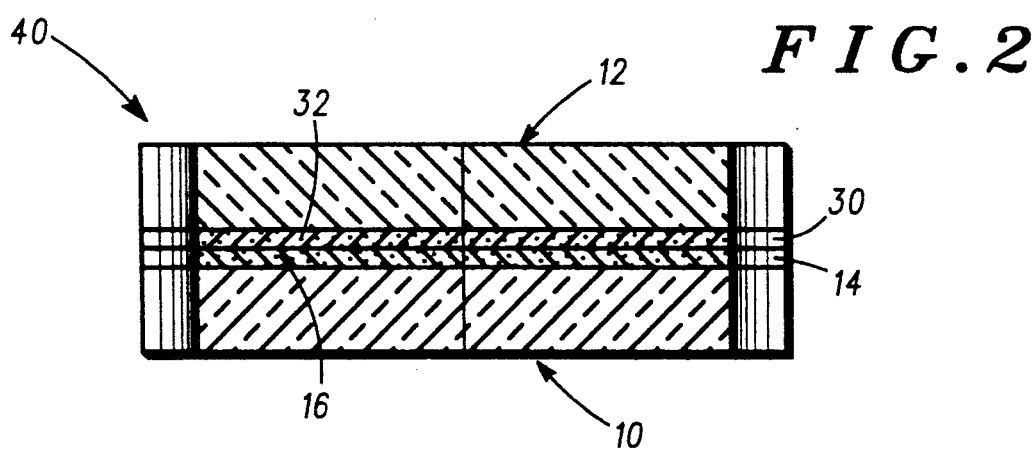
FIG. 2 is a cross-sectional view of an assembly of the elements in FIG. 1 prior to bonding.

In preparation for bonding, elements 10 and 12 are arranged in an assembly 40 in FIG. 2 wherein faying surface 30 of element 12 is superposed onto faying surface 14 of element 10. More particularly, films 32 lie against corresponding films 16; and films 34 lie against films 18.

Figure 3:
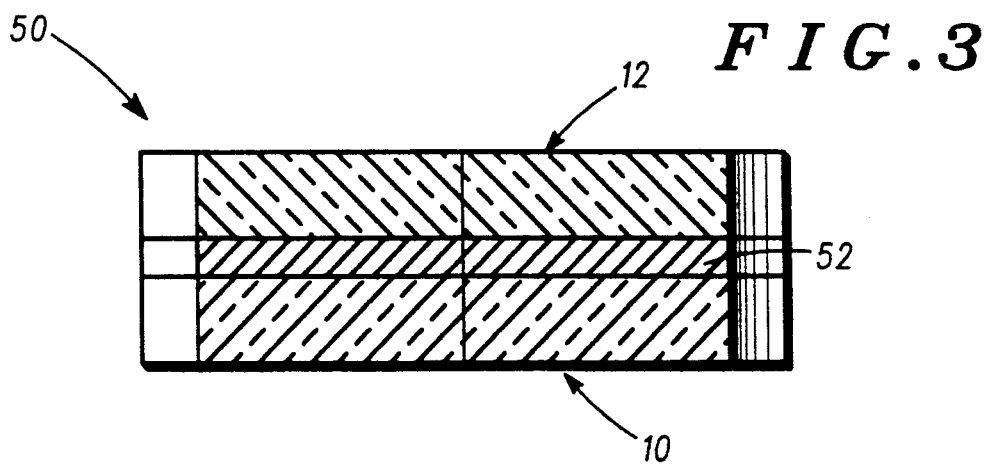
FIG. 3 is a cross-sectional view of a product bonded filter formed from the assembly in FIG. 2.

In accordance with this invention, assembly 40 is heated in air at a temperature of 910° C. for 10 minutes. At this temperature, any residual solvent and any organic binder is vaporized and escapes through the seam between the faying surfaces. Also, the silver particles diffusion bond to produce an integral metal structure. Concurrently, the silver bonds to the adjacent ceramic surface. The resulting assembly 50 shown in FIG. 3, comprises elements 10 and 12 bonded by a substantially silver layer 52 derived from the films 16 and 32. Silver layer 52 has a thickness of about 46 microns. Layer 52 forms a resonator in the filter.

Therefore, the method of this invention produces an integrally bonded structure that comprises a first and a second ceramic element bonded by a sintered silver layer. It is a significant feature of this invention that the silver layer is derived from particulate films that are applied to the individual faying surfaces as a paste. The paste permits the film to be applied conveniently by screen printing or other suitable techniques. In the preferred embodiment, a film is applied to each faying surface to provide a sufficient mass of silver for bonding the ceramic surfaces together. The dried film is composed predominantly of the silver particles, bonded by a minor amount of organic compound. It is desired to apply sufficient paste to each surface to form a dried particulate film having a thickness of at least about 20 microns and preferably at least about 30 microns. Thereafter, during sintering, the metal particles diffusion bond to produce an integral layer. This is accompanied by consolidation of the silver. In general, for resonator applications, it is desired to form a layer having a thickness of at least about 30 microns and preferably between about 35 and 50 microns.

It is also a significant feature of this invention that sintering is carried out without the formation of a liquid phase. Molten silver does not wet ceramic and so does not form the desired bond and to the faying surfaces. Accordingly, the sintering temperature is maintained less than the silver melting point of about 961° C. It is desired to maximize the temperature to reduce diffusion bonding time. In general, an optimum range of sintering temperatures is greater than about 850° C. and preferably between about 850° C. and 930° C.

The method of this invention is preferably carried out to form a metallic layer that is composed substantially of silver, except for impurities. This is accomplished by forming a film predominantly composed of silver particles. Alternately, the layer may contain minor amounts of alloying agents, to enhance bonding or to obtain desired electrical or other properties in the product. Such agents may be added as discrete particles or prealloyed in the silver particles. Thus, as used herein silver particles refers to particles formed predominantly of silver metal and optionally containing a minor amount of alloy, preferably less than 5 weight percent.

While this invention has been described in terms of certain embodiments thereof, it is not intended that it be limited to the above description but rather only to the extent set forth in the claims that follow.

The embodiments of the invention in which an exclusive property or privilege is claimed are defined as follows:

We claim:

1. A solid state silver sintering method for bonding a first preformed ceramic element having a first faying surface to a second preformed ceramic element having a second faying surface, said method using a silver powder paste composed of silver particles dispersed in a volatile solvent vehicle, said method comprising
   applying and drying a first film of said paste onto said first faying surface,
   applying and drying a second film of said paste onto said second faying surface,
   assembling said first element and said second element with said first film in contact with said second film, and
   heating the assembly to a temperature and for a time sufficient to sinter said particles to form an integral silver layer and to bond said silver layer to each faying surface to thereby form a product assembly comprising said ceramic elements bonded by said silver layer, wherein said temperature is less than the melting point of silver.

2. The method in accordance with claim 1 wherein said first film and said second film are formed predominantly of said silver particles.

3. The method in accordance with claim 1 wherein the sintered layer consists substantially of silver.

4. The method in accordance with claim 1 wherein the assembly is heated at a temperature less than the silver melting point.

5. The method in accordance with claim 1 wherein the assembly is heated at a temperature between about 850° C. and 930° C.

6. A solid state silver sintering method for bonding a first preformed ceramic element having a first faying surface to a second preformed ceramic element having a second faying surface, said method using a silver powder paste composed of silver particles dispersed in a volatile solvent vehicle comprising a vaporizable organic binder, said method comprising applying and drying said paste onto said first faying surface to form a first film composed predominantly of said silver particles and having a thickness greater than about 20 microns, applying and drying said paste onto said second faying surface to form a second film composed predominantly of said silver particles and having a thickness greater than about 20 microns, assembling said first element and said second element with said first powder film in contact with said second powder film, and heating the assembly at a temperature and for a time sufficient to sinter the silver particles into an integral silver layer having a thickness greater than about 30 microns and to bond said silver layer to the adjacent ceramic surfaces to thereby bond the elements into a product assembly, wherein said temperature is less than the melting point of silver.

7. The method in accordance with claim 6 wherein the first film is applied to a region of the first faying surface in a predetermined pattern and said second film is applied in a pattern superposable onto the first film.

8. The method in accordance with claim 6 wherein the silver layer consists substantially of silver.

9. The method in accordance with claim 6 wherein the integral silver layer has a thickness between about 35 and 50 microns.

10. The method in accordance with claim 6 wherein the assembly is heated at a temperature between about 850° C. and 930° C.

11. A method of manufacturing a stripline filter comprising a first ceramic element having a first preformed faying surface, a second ceramic element having a second preformed faying surface, and a metallic resonator element interposed between said first faying surface and said second faying surface, said method comprising applying and drying said paste onto a region of said first faying surface to form a first film, said paste comprising silver particles dispersed in a volatile solvent vehicle, said first film being applied in a pattern corresponding to a desired resonator configuration, applying and drying a second film of said paste onto said second faying surface, said second film being applied in a configuration superposable onto the first film, assembling said first element and said second element with said first film superposed in contact with said second film, and heating the assembly to a temperature and for a time sufficient to sinter said particles into an integral silver layer and to bond said silver layer to an adjacent ceramic surface to form the filter, wherein said temperature is less than the melting point of silver.

12. The method in accordance with claim 11 wherein the sintered layer is composed substantially of silver.

13. A method of manufacturing a stripline filter comprising a first ceramic element having a first preformed faying surface, a second ceramic element having a second preformed faying surface, and a metallic resonator element interposed between said first faying surface and said second faying surface, said method comprising applying and drying a paste onto a region of said first faying surface to form a first film, said paste comprising silver particles dispersed in a volatile solvent vehicle and containing a vaporizable organic compound suitable for bonding the silver particles into the film, said first film being composed predominantly of said silver particles and having a thickness of at least 20 microns, said first film being applied in a pattern corresponding to a desired resonator configuration, applying and drying said paste onto said second faying surface to form a second film, said second film being composed predominantly of said silver particles and having a thickness of at least 20 microns, said second film being applied in a configuration superposable onto the first film, assembling said first element and said second element with said second film superposed in contact with said first film, and heating the assembly to a temperature between about 850° C. and 930° C. for a time sufficient to vaporize the organic compound and to sinter said particles into an integral silver layer having a thickness of at least about 30 microns and to bond said silver layer to an adjacent ceramic surface to form the filter, whereby said silver layer forms a resonator of said filter.

14. The method in accordance with claim 13 wherein each said first and second film has a dried thickness of at least about 30 microns.

15. The method in accordance with claim 13 wherein the integral silver layer has a thickness of between about 35 and 50.

16. The method in accordance with claim 13 wherein the silver layer consists substantially of silver.

* * * * *